3,090,784
TERTIARY AMINE SALTS OF 2,4-BIS-HALOALKYL-6-HYDROXY-1,3,5-TRIAZINES

Ehrenfried H. Kober, Columbus, Ohio, assignor to Olin Mathieson Chemical Corporation, a corporation of Virginia
No Drawing. Filed June 4, 1959, Ser. No. 817,988
13 Claims. (Cl. 260—247.5)

This invention relates to novel tertiary amine salts of 2,4-bis-haloalkyl-6-hydroxy-1,3,5-triazines of the general formula:

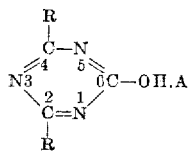

wherein R is a haloalkyl radical having at least two halogen substituents on the α carbon atom of the haloalkyl radical and A is a tertiary amine. Although haloalkyl radicals containing up to 12 carbon atoms are included in the scope of this invention, the preferred haloalkyl radicals are the lower haloalkyl radicals containing 1 to 4 carbon atoms, for example, dichloromethyl, trichloromethyl, α,α-dichloroethyl, α,α-dichloro-n-propyl, and the corresponding fluorine, bromine and iodine derivatives. Suitable tertiary amines include the aliphatic tertiary amines, for instance, trialkylamines such as trimethylamine, triethylamine, triisopropylamine, tributylamine, and N-alkyl substituted heterocyclic amines such as N-methylmorpholine, and N-methylthiomorpholine, and N-alkyl substituted alicyclic amines such as N,N-dimethyl cyclohexyl amine, N,N-diethylcyclohexylamine and N,N-diethylcyclopentyl amine, etc.

The new triazine salts of this invention are produced by reacting a 2,4,6-tris-haloalkyl-1,3,5-triazine with water in the presence of a tertiary amine according to the following equation:

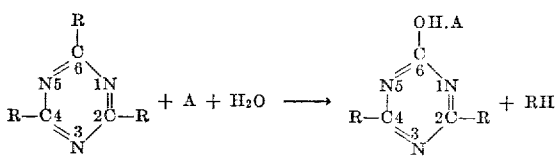

wherein R and A have the same meaning as previously defined. The reaction proceeds smoothly when the 2,4,6-tris-haloalkyl-1,3,5-triazine, the tertiary amine, and water are admixed at temperatures of from about 0° C. to about 100° C. The required reaction time may vary from about ½ hour to 40 hours or more depending on the particular triazine and amine used. It is essential that the α-carbon atom of the haloalkyl group R have at least two halogen substituents. Triazine derivatives, useful as starting materials in the process of this invention include, 2,4,6-tris-trihalomethyl - 1,3,5 - triazines, 2,4,6-tris-α,α-dihalo-ethyl-1,3,5-triazines, 2,4,6-tris-pentahaloethyl - 1,3,5 - triazines, 2,4,6-tris-α,α-dihalo - n - propyl-1,3,5-triazines and 2,4,6-tris-α,α-dihalo-n-butyl-1,3,5-triazines.

Treatment of the compounds of this invention with phosphorus oxychloride results in the formation of 2,4-bis-haloalkyl-6-halo-1,3,5-triazines which are useful as fungicides and intermediates. These novel halo-triazines are described and claimed in United States Patent 2,880,-207. The compounds of this invention are also useful in preparing 2,4-bis-alkyl-6-hydroxy-1,3,5-triazines by a process described and claimed in pending application Serial No. 817,989, filed June 4, 1959, now abandoned. When 2,4-bis-alkyl-6-hydroxy-1,3,5-triazines are reacted with a phosphorus oxyhalide 2,4-bis-alkyl-6-halo-1,3,5-triazines as described and claimed in United States Patent 2,880,207, are formed. These halo-triazines are also useful as fungicides and intermediates.

The following examples illustrate the preparation of the novel compositions.

EXAMPLE I

*2,4-Bis-Trichloromethyl-6-Hydroxy-1,3,5-Triazine Triethylamine Salt*

To a solution of 8.68 grams of 2,4,6-tris-trichloromethyl-1,3,5-triazine in 75 milliliters of ethanol and 75 milliliters of water at 0° C., there was added 7.3 grams of triethylamine. The solution was maintained at 0° C. for 32 hours and at the end of that time the ethanol, excess water and excess triethylamine were removed in vacuo at a bath temperature of 10° C. Upon addition of a small amount of Skellysolve F, crystals precipitated from the oily residue. The formed crystals of 2,4-bis-trichloromethyl-6-hydroxy-1,3,5-triazine triethylamine salt (3.8 grams) were filtered and recrystallized from 4000 milliliters of Skellysolve C, yielding needle-like crystals having a melting point of 178°–180° C.

Calcd. for $C_{11}H_{16}N_4Cl_6O$: C, 30.51; H, 3.75; N, 12.94; Cl, 49.11. Found: C, 30.59; H, 3.77; N, 12.89; Cl, 47.86.

EXAMPLE II (A) *2,4-Bis-Trichloromethyl-6-Hydroxy-1,3,5-Triazine Triethylamine Salt*

A mixture of 43.35 grams of 2,4,6-tris-trichloromethyl-1,3,5-triazine, 42.8 grams of triethylamine, and 250 milliliters of water was refluxed, with stirring, for three hours. After cooling overnight, 35.3 grams of crystals or 81.5 percent of the theoretical quantity of the 2,4-bis-trichloromethyl-6-hydroxy-1,3,5-triazine triethylamine salt was obtained by filtration. These crystals had a melting point of 173°–177° C. After one recrystallization from dioxane, the salt melted at 178°–180° C.

(B) *2,4-Bis-Trichloromethyl-6-Chloro-1,3,5-Triazine*

A total of 30 grams of 2,4-bis-trichloromethyl-6-hydroxy-s-triazine triethylamine salt was stirred and refluxed with 150 milliliters of phosphorus-oxychloride for three hours. The excess phosphorus-oxychloride was removed in vacuo and the resulting oil slowly added to a mixture of ice and water. The oily 2,4-bis-trichloromethyl-6-chloro-s-triazine was taken up with Skellysolve F. After the solution had been concentrated to about 50 milliliters and kept at —20° C. for five hours, 11.0 grams of crystals precipitated which were filtered off. A further crop of 11.1 grams of crystals was obtained when the mother liquor was concentrated to about 25 milliliters and cooled again to —20° C., thus improving the yield of pure 2,4-bis-trichloromethyl-6-chloro-s-triazine to 91.4 percent. The melting point of this compound was 56°–57° C. and showed no depression with an authentic sample.

EXAMPLE III

*2,4-Bis-Trichloromethyl-6-Hydroxy-1,3,5-Triazine Tri-n-Butylamine Salt*

A mixture of 36 grams of 2,4,6-tris-trichloromethyl-1,3,5-triazine, 54 grams of tri-n-butylamine, and 200 milliliters of water was refluxed, with stirring, for three hours. After cooling overnight, the reaction mixture was found to consist of two layers. The heavier oily layer was separated from the lighter aqueous layer. The oil precipitated upon addition of Skellysolve B and subsequent evaporation of the solvent. Thus, 32.9 grams or 76.5 percent of the theoretical quantity of the 2,4-bis-trichloromethyl-6-hydroxy-1,3,5-triazine tri-n-butylamine salt, was obtained. The crystals melted at 106°–108° C. after one recrystallization from Skellysolve B.

Calcd. for $C_{17}H_{28}N_4Cl_6O$: C, 39.48; H, 5.46; N, 10.83; Cl, 41.14. Found: C, 39.63; H, 5.49; N, 10.73; Cl, 41.11.

EXAMPLE IV

*2,4-Bis-Trichloromethyl-6-Hydroxy-1,3,5-Triazine N-Ethylpiperidine Salt*

A mixture of 31 grams of 2,4,6-tris-trichloromethyl-s-triazine, 33.5 grams of N-ethylpiperidine, and 200 milliliters of water was refluxed, with stirring, for one hour. After cooling, the formed 2,4-bis-trichloromethyl-6-hydroxy-1,3,5-triazine N-ethylpiperidine salt was filtered off. The yield of the salt was 28.5 grams or 90.0 percent of theoretical quantity. After recrystallization from dioxane the needle-like crystals melted at 215°–216.5° C.

Calcd. for $C_{12}H_{16}N_4Cl_6O$: C, 32.38; H, 3.62; N, 12.59; Cl, 47.81. Found: C, 32.20; H, 3.94; Cl, 47.81.

EXAMPLE V

*2,4-Bis-Trichloromethyl-6-Hydroxy-1,3,5-Triazine N-Methylmorpholine Salt*

A mixture of 34 grams of 2,4,6-tris-trichloromethyl-s-triazine, 33 grams of N-methylmorpholine, and 200 milliliters of water was refluxed, with stirring, for two hours. After cooling, the formed 2,4-bis-trichloromethyl-6-hydroxy-s-triazine N-methylmorpholine salt was filtered off. The yield of the crystalline salt was 34.0 grams or 100 percent of the theoretical quantity. Recrystallization from dioxane gave crystals which melted at 202°–204° C.

Calcd. for $C_{10}H_{12}N_4Cl_6O_2$: C, 27.74; H, 2.79; N, 12.94; Cl, 49.13. Found: C, 27.67; H, 2.92; N, 12.83; Cl, 49.04.

What is claimed is:

1. 2,4-bis-haloalkyl-6-hydroxy-1,3,5-triazine tertiary amine salts of the formula:

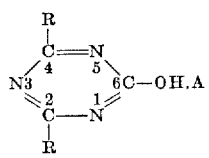

wherein R is a haloalkyl radical having not more than 12 carbon atoms and having at least two halogen substituents on the α carbon atom and A is a tertiary amine selected from the group consisting of trialkylamines of the formula $R_3N$ wherein R is an alkyl radical having from 1 to 7 carbon atoms, N-alkyl heterocyclic amines of the formula:

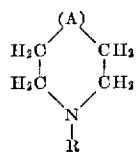

wherein A is selected from the group consisting of oxygen, sulfur and the methylene radical and R is an alkyl radical having from 1 to 4 carbon atoms, and N,N-dialkyl alicyclic amines of the formula:

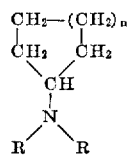

wherein n is an integer of from 1 to 2 and R is an alkyl group having 1 to 4 carbon atoms.

2. The tertiary amine salt of claim 1 in which R is a trichloroalkyl radical.

3. 2,4-bis-trichloromethyl - 6 - hydroxy-1,3,5-triazine triethylamine salt.

4. 2,4-bis-trichloromethyl - 6 - hydroxy-1,3,5-triazine tri-n-butylamine salt.

5. 2,4-bis-trichloromethyl - 6 - hydroxy-1,3,5-triazine N-ethylpiperidine salt.

6. 2,4-bis-trichloromethyl - 6 - hydroxy-1,3,5-triazine N-methylmorpholine salt.

7. The process of preparing 2,4-bis-haloalkyl-6-hydroxy-1,3,5-triazine tertiary amine salts of the formula:

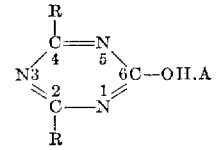

wherein R is a haloalkyl radical having at least two halogen substituents on the α carbon atom and A is a tertiary amine, which comprises reacting a 2,4,6-tris-haloalkyl-1,3,5-triazine of the formula:

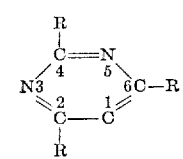

wherein R is a haloalkyl radical having not more than 12 carbon atoms and having at least two halogen substituents on the α carbon atom, with water and in the presence of a tertiary amine selected from the group consisting of trialkylamines of the formula $R_3N$ wherein R is an alkyl radical having from 1 to 7 carbon atoms, N-alkyl heterocyclic amines of the formula:

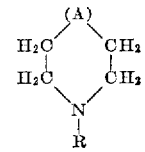

wherein A is selected from the group consisting of oxygen, sulfur and the methylene radical and R is an alkyl radical having from 1 to 4 carbon atoms, and N,N-dialkyl alicyclic amines of the formula:

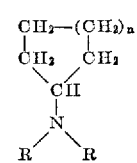

wherein n is an integer of from 1 to 2 and R is an alkyl group having 1 to 4 carbon atoms.

8. The process of claim 7 in which the reaction temperature is about 0° to 100° C.

9. The process of claim 8 in which the 2,4,6-tris-haloalkyl-1,3,5-triazine is 2,4,6-tris-trichloromethyl-1,3,5-triazine.

10. The process of claim 9 in which the tertiary amine is triethylamine.

11. The process of claim 9 in which the tertiary amine is tri-n-butylamine.

12. The process of claim 9 in which the tertiary amine is N-ethylpiperidine.

13. The process of claim 9 in which the tertiary amine is N-methylmorpholine.

References Cited in the file of this patent

UNITED STATES PATENTS

| | | |
|---|---|---|
| 2,822,270 | Kirkpatrick et al. | Feb. 4, 1958 |
| 2,876,221 | Schroeder et al. | Mar. 3, 1959 |
| 2,880,207 | Schroeder et al. | Mar. 31, 1959 |

(Other references on following page)

OTHER REFERENCES

Claus et al., J. für Prakt. Chem., volume 38 (NF Series), pages 225 to 229 (1888).

Borche, Journal für Prakt. Chemie, volume 50, page 115 (1894).

Beilstein's Handbuch der Organischen Chemie, volume 26, 4th edition, page 243, Berlin (1937).

Chemical Abstracts, volume 37, pages 131 to 133, noting page 132 in particular (1943). (Abstract of Ostrogovics et al., Gazz. Chim. Ital., volume 71, pages 496 to 523 (1941).)

Saure, Deutsche Chemische Gesellschaft Berichte, volume 83, page 336 (1950).

Karrer, Organic Chemistry, 4th English ed., pages 828, 866, 870, and 904, Elsevier Publishing Co., New York (1950).

Schroeder et al., Journal of the American Chemical Society, volume 78, pages 2447–2451 (1956).

Smolin et al., "S-Triazines and Derivatives," pages 36 to 44 and 326 to 327, Interscience Publishers, Inc., New York (1959).

Smolin et al., "S-Triazines and Derivatives," pages 189, 205 and 216, Interscience Publishers, Inc., New York, February 1959.

UNITED STATES PATENT OFFICE
CERTIFICATE OF CORRECTION

Patent No. 3,090,784                      May 21, 1963

Ehrenfried H. Kober

It is hereby certified that error appears in the above numbered patent requiring correction and that the said Letters Patent should read as corrected below.

Column 3, line 17, for "$C_{12}H_{16}N_4CI_6O$" read -- $C_{12}H_{16}N_4Cl_6O$ --; column 4, lines 20 to 24, the formula should appear as shown below instead of as in the patent:

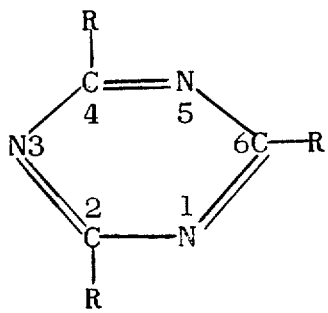

Signed and sealed this 24th day of December 1963.

(SEAL)
Attest:
ERNEST W. SWIDER

Attesting Officer

EDWIN L. REYNOLDS
Acting Commissioner of
Patents